(12) United States Patent
Vicaire et al.

(10) Patent No.: US 9,860,303 B1
(45) Date of Patent: Jan. 2, 2018

(54) DATA CENTER GROWTH CONTROL

(71) Applicant: Amazon Technologies, Inc., Reno, NV (US)

(72) Inventors: Pascal Albert Vicaire, Seattle, WA (US); Christopher Anthony Romanzin, Seattle, WA (US); Baochun Jin, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 730 days.

(21) Appl. No.: 14/040,282

(22) Filed: Sep. 27, 2013

(51) Int. Cl.
*G06F 15/16* (2006.01)
*H04L 29/08* (2006.01)
*H04L 12/801* (2013.01)

(52) U.S. Cl.
CPC .............. *H04L 67/10* (2013.01); *H04L 47/10* (2013.01); *H04L 47/193* (2013.01); *H04L 47/29* (2013.01); *H04L 67/1008* (2013.01); *H04L 67/1012* (2013.01); *H04L 67/1029* (2013.01)

(58) Field of Classification Search
CPC . H04L 67/10; H04L 67/1008; H04L 67/1012; H04L 67/1029; H04L 47/10; H04L 47/193; H04L 47/29
See application file for complete search history.

(56) References Cited

U.S. PATENT DOCUMENTS

| | | | | |
|---|---|---|---|---|
| 2003/0115024 A1* | 6/2003 | Snevely | .................. | G06Q 30/02 703/1 |
| 2007/0067296 A1* | 3/2007 | Malloy | .................. | H04L 41/145 |
| 2008/0086567 A1* | 4/2008 | Langen | ................ | H04L 65/1046 709/230 |
| 2009/0168345 A1* | 7/2009 | Martini | ................ | F24F 11/0001 361/691 |
| 2010/0058350 A1* | 3/2010 | Boss | ..................... | G06F 9/5094 718/104 |
| 2010/0211669 A1* | 8/2010 | Dalgas | .................. | G06F 9/5027 709/224 |
| 2011/0235999 A1* | 9/2011 | Quan | ..................... | H04N 5/913 386/326 |
| 2011/0295999 A1* | 12/2011 | Ferris | .................... | G06F 9/5072 709/224 |
| 2012/0011190 A1* | 1/2012 | Driesen | .................. | G06Q 10/06 709/202 |
| 2013/0042005 A1* | 2/2013 | Boss | ..................... | G06F 9/5011 709/226 |
| 2013/0080623 A1* | 3/2013 | Thireault | .............. | G06F 9/5027 709/224 |
| 2013/0346572 A1* | 12/2013 | Jain | ....................... | G06F 9/5088 709/223 |
| 2015/0088586 A1* | 3/2015 | Pavlas | ................. | G06F 9/45558 705/7.25 |

* cited by examiner

*Primary Examiner* — Krisna Lim

(74) *Attorney, Agent, or Firm* — Klarquist Sparkman, LLP

(57) ABSTRACT

A cloud computing environment in which a plurality of data centers are populated through the launching of resources in a controlled manner. Parameters such as current usage, future projected usage and a future maximum capacity can be used decide in which data center to launch a resource. A data center can be chosen so as to minimize a possibility that the data center becomes constrained at a future point in time. Selection is such that an equal percentage of future capacity is maintained across data centers.

16 Claims, 9 Drawing Sheets

DATA CENTER GROWTH CONTROL

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Managing network-based services, such as those described above, can be extremely complex. At least some of this complexity is attributable to the large number of instances of computing resources and other types of resources that typically exist in such a service at any given time. For example, some network-based services might utilize dozens of data centers around the world, hundreds of thousands or even millions of server computers, along with large numbers of networking components, software programs, and other types of resources. When a large number of resources are utilized by a network service in this way, it can be very difficult to balance hosts or other network components so that one data center does not become overloaded.

For example, when launching new instances in data centers, it can be difficult to decide in which data center to launch the instances. One technique can be to launch the instances in a data center that has the most available capacity. Unfortunately, the data centers having the most available capacity are often the largest data centers, which are buying capacity quickly because most requests for resources are being directed to them. The result is some data centers grow very rapidly until they reach capacity, while others grow very slowly. However, there is a limit to the extent with which a datacenter can grow because of physical constraints. For example, it is only possible to add additional rooms to accommodate additional racks and hosts until space runs out at the datacenter site. There are other possible constraints that can limit the growth of datacenters, such as the total capacity of the power supply, whether the datacenter can have multiple floors, etc.

Having a datacenter reach its full capacity and become permanently constrained is an issue for customers. For instance, if only two datacenters are available in a region, and one of the datacenters reaches full capacity, new customers can only launch instances in a single datacenter and the resulting website could be unavailable to its users for a day or more in case of a major event in that datacenter.

DETAILED DESCRIPTION

Data center growth can occur through web-service requests, which are often associated with cloud computing. A web service is a software function provided at a network address over the web or the cloud. Clients initiate web service requests to servers and servers process the requests and return appropriate responses. The client web service requests are typically initiated using, for example, an API request. For purposes of simplicity, web service requests will be generally described below as API requests, but it is understood that other web service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a web service receives the API request from a client device, the web service can generate a response to the request and send the response to the endpoint identified in the request.

Figure 1:
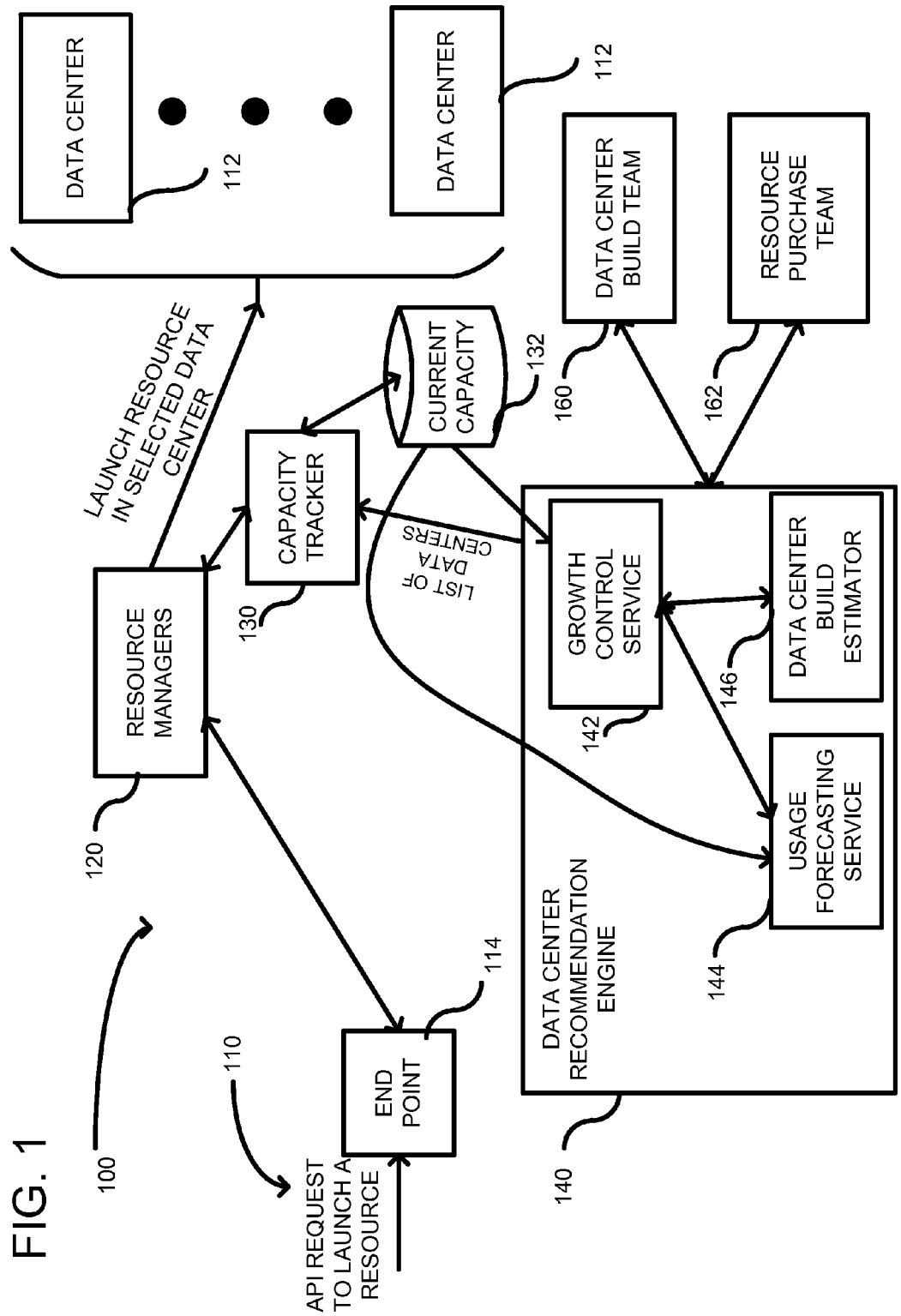
FIG. 1 is a system diagram according to an embodiment for controlling growth of a plurality of data centers.

FIG. 1 shows a system 100 for receiving an API request 110 used to launch a resource in one of a plurality of data centers 112. Each data center typically includes a plurality of resources (e.g., hardware assets, such as host server computers, routers, switches, etc.) within one or more buildings. Each data center, as described herein, can be a logical or a physical data center. The API request can be a so-called untargeted request wherein a particular data center is not identified. As such, the system 100 can choose the data center in which to launch the resource. In the event that the API request is a targeted request, then the system 100 automatically launches the resource in the data center identified in the API request. Various types of resources can be launched using targeted and untargeted requests, such as data processing resources, data storage resources, networking resources, data communication resources, instances on host server computers, and the like.

The API request 110 can be received by an end point 114, which is often associated with a web address adapted for receiving such requests. For untargeted requests, one or more resource managers 120 can decide into which data center to launch the resource in response to the API request under the advisement of a capacity tracker 130. The capacity tracker 130 can use a database 132 including resources currently available to launch. Additionally, the capacity tracker 130 can receive a list of data centers from a data center recommendation engine 140. The data center recommendation engine 140 can generate the list of data centers supplied to the capacity tracker 130 using a number of sub-components that can be included as part of the data center recommendation engine 140. For example, a growth control service 142 can supply an algorithm designed to balance the growth of the data centers 112 based on future predictions of capacity. The future capacity predictions can be based on future usage forecasts, as supplied by a usage forecasting service 144 and future predictions of data center growth, as supplied by a data center build estimator 146.

The usage forecasting service 144 can accumulate data from the current capacity database 132 or from the capacity tracker 130 to forecast future usage (both targeted and untargeted) using time series prediction algorithms. For example, past data trends can be used to predict future usage at predetermined time intervals. The forecasting service 144 can output data in the following form:

- targeted requests, 2013/09/10 (future date)=>7000 large instances launched through targeted requests will be used in data center 1.
- targeted requests, 2013/09/17 (future date)=>8000 large instances launched through targeted requests will be used in data center 1.
- targeted requests, 2013/09/24 (future date)=>9000 large instances launched through targeted requests will be used in data center 1.

Similar targeted requests can be used for other data centers. Likewise, data can be output for untargeted requests:

- untargeted, 2013/09/10=>5000 large instances launched through untargeted requests will be used in either in data centers 1, 5 and 6.
- untargeted, 2013/09/17=>etc.

The data center build estimator 146 can describe a maximum number of racks positions that can be available and by what time in the future. The data center build estimator 146 provides data that indicates the maximum number of hosts that a datacenter can support when all the possible rooms have been built and filled with racks. A database (not shown) of the data center build estimator 146 aggregates data that answer the following questions:

- How much time does it take to build a new datacenter room?
- When will we have enough personnel to build the new room and install the new rack positions?
- When will we have the financial resources to build a new room?
- When will the land to build the new room become available?
- When will the needed tools and hardware elements be available to build the new room and new rack positions?
- etc.

The data may be populated in the database by a manual operator or automatically.

The output of the data center build estimator can be is of the following form:
- 2013/08/05=>1000 rack positions can be available in data center 1.
- 2013/09/10=>1500 rack positions can be available in data center 1.
- 2013/10/10=>2000 rack positions can be available in data center 1.

The growth control service 142 can retrieve current usage data (e.g., a number of instances executing in the data centers) from the current capacity database 132, together with the future usage at predetermined time intervals from the usage forecasting service 144 and the future maximum capacity obtained from the data center build estimator 146 in order to determine a priority order of data centers in which the resource should be launched.

In particular, the growth control service 142 returns to the capacity tracker 130 a list of data centers starting with a data center that is the furthest away from its current usage target (i.e., the least occupied), to the one that is the closest to its current usage target. The capacity tracker 130 first tries to allocate the request to the data center that is first on the list. It may not allocate the request to the first data center if, for instance, there is not free capacity for that data center according to the database 132. Then the capacity tracker 130 uses the next data center on the list and so on. Once a proper data center is determined, the capacity tracker 130 transmits the selected data center to the resource manager 120 for launching. Thus, an API request is ultimately transformed into a decision to launch on a particular data center based on a planned strategy for distributed growth.

There are a variety of options which the growth control service 142 can use to generate the list of data centers. In one embodiment, the growth control service 142 can place on the list the data center that is the least full with respect to its largest possible size, including future unbuilt rooms. For instance, if data center A is 25% full and data center B is 26% full, the request is allocated to data center A. The growth control service 142 can further check that allocating an untargeted request to the data center does not lead to the data center being constrained at some point in the future. If the data center will not get full, then the growth control service 142 can allocate the untargeted requests to that data center. If the data center will get full because of future targeted request, then that zone is reduced or removed from the list. Thus, the list can be based on a desired balancing of resources across data centers so as to maximize a time before which any data center becomes full and unable to accommodate additional demand for capacity. In an alternative embodiment, the growth control service 142 can assign weighting information to resources in the capacity database 132 so as to influence a decision by the capacity tracker 130.

The data center recommendation engine 140 can further supply future usage forecast to a data center build team service 160 and a resource purchase team service 162. The data center build team 160 is a service that analyzes the future requirements for building of extensions onto data centers. The resource purchase team 162 can receive the future usage forecasts and purchase new resources to meet demand.

In one particular example, the data center growth control service 142 receives a total number of running instances received from the current capacity database 132 and converts the total number of running instances into a number of host server computers running in the data centers. For example, a type of instance that is large can occupy a complete host and therefore counts as one host. On the other hand, other instance types can be small instances that can fit on a portion of a host and may only count as ⅛ of host server computer.

The datacenter growth control service 142 can then compute the current occupancy of each datacenter based on a future potential maximum capacity. For instance if datacenter A can accommodate a maximum of 1000 hosts, and is currently running a number of instances that can fill 500 hosts, the occupancy is ½. If datacenter B can accommodate 500 hosts, and is currently running a number of instances that can fill 50 hosts, the occupancy is ¹/₁₀. The datacenter growth control service 142 can select the datacenter that has the least occupancy. In the example above, datacenter B would be selected. The datacenter growth control service then can re-configure the capacity tracker 130 or capacity database 132 so that all of the untargeted requests are redirected to the datacenter with the smallest occupancy. The datacenter growth control service 142 can goes through this process periodically so that it redirects all requests to the datacenter with the least occupancy.

An advantage of the system 100 is that after the datacenter growth control service 142 has been running for a while, all data centers 112 within a region will have the same occupancy (within a small margin of error). The data centers 112 will then grow in such a way that their occupancy increases the same constant C during an interval of time T. For instance, if datacenter A and datacenter B specified above now both have an occupancy of ½, and if datacenter A has a usage growth of 250 hosts within a month, the datacenter growth control service 142 will ensure that datacenter B has a usage growth of 125 hosts within the same month, so that both their occupancies become ¾. This scheme maximizes the time before which any datacenter becomes full and unable to accommodate additional demand for capacity.

Just as the datacenter growth control service 142 distributes untargeted requests among data centers 112, a similar 'regional growth control service' could distribute requests that do not specify a region amongst regions. For instance, a customer may not care whether its instances are launched in SFO, PDX, or IAD (which are all regions located within the United States). The service can then distribute the untargeted requests among regions to make sure that no region becomes full before the other regions.

In cases where a data center is temporarily out of capacity, the algorithm can be modified. Assume that datacenter A has an occupancy of ½ and datacenter B an occupancy of ¹/₁₀. If datacenter B has no free capacity because, even though there is space for more racks and hosts, none were provisioned, the algorithm can take this into consideration and temporarily redirect all requests to data center A even though its occupancy is higher. Once capacity is provisioned for datacenter B, the algorithm can resume as normal and attempt to grow datacenter B by redirecting untargeted requests to it until it has the same occupancy of datacenter A. There are many reasons for which free capacity may be temporarily unavailable in datacenter B: power failure, deployment of defective infrastructure software, networking problems, hurricane, earthquake.

Figure 2:
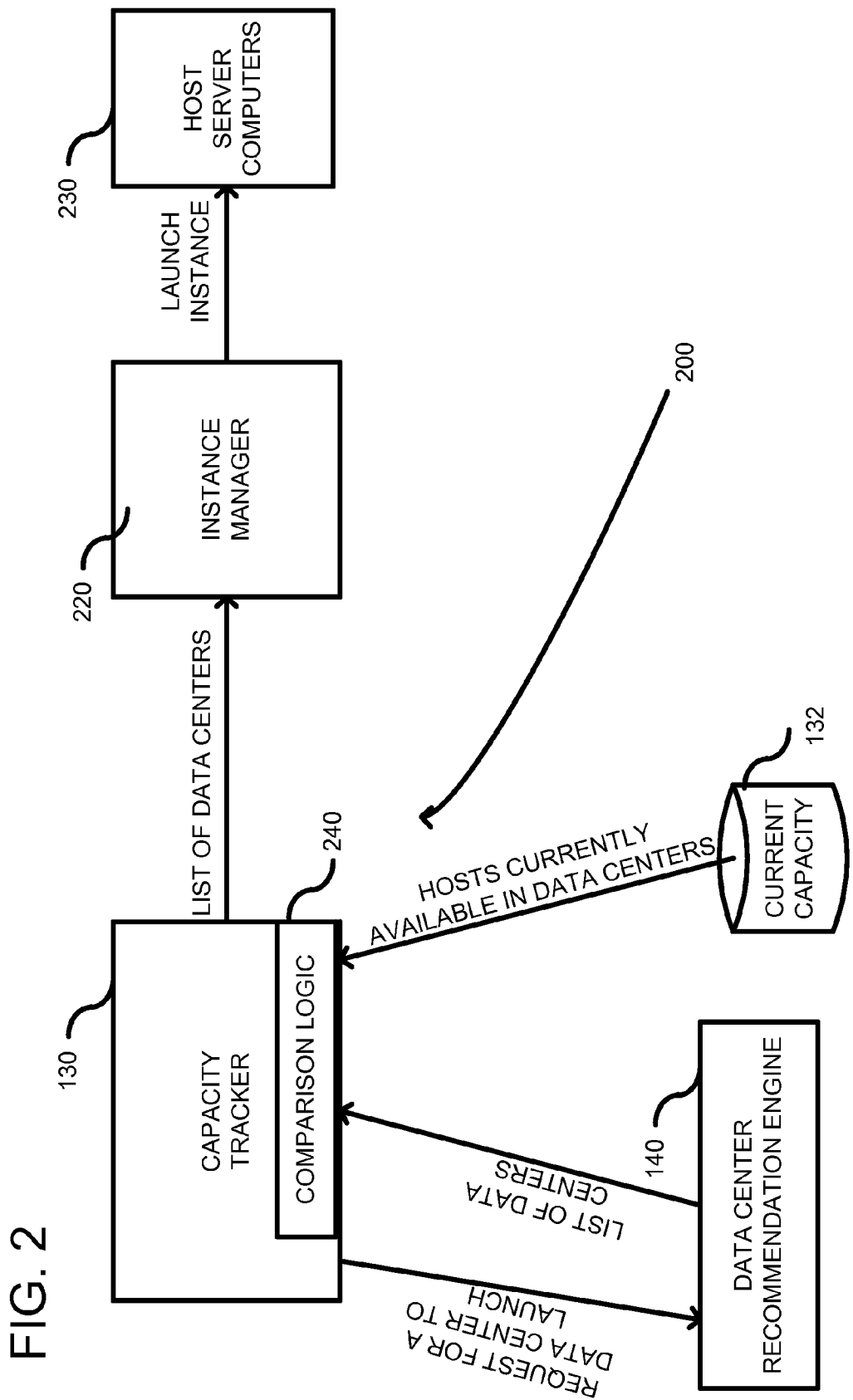
FIG. 2 shows further details of a particular embodiment wherein instances are being launched on host server computers within a data center.

FIG. 2 shows a particular embodiment of a system 200 wherein the resources are associated with instances being launched by an instance manager 220 on host server computers 230 within one or more data centers. As described above, the capacity tracker 130 sends a received request to launch in a data center to the data center recommendation engine 140. In response, the data center recommendation engine 140 generates, based on current capacity and future capacity, a list of data centers in priority order. Comparison logic 240 in the capacity tracker 130 uses the list of data centers to compare host server computers associated with the data centers to host server computers that are listed as available in the capacity database 132. If a match is found starting with the first data center in the list, then the capacity tracker 130 can transmit the selected data center to the instance manager 220 for launching. However, if the first data center on the list is not available in the capacity database 132, then the next data center on the list is used for comparison, and so on, until a data center is found in the current capacity database 132. Once a host within a data center is found that satisfies both the current capacity 132 and the list of data centers provided by the data center recommendation engine 140, then the selected database is passed to the instance manager 220. In response to the API request, the instance manager 220 schedules the instance to be launched in the selected data center and returns an API response indicating a successful launch.

Figure 3:
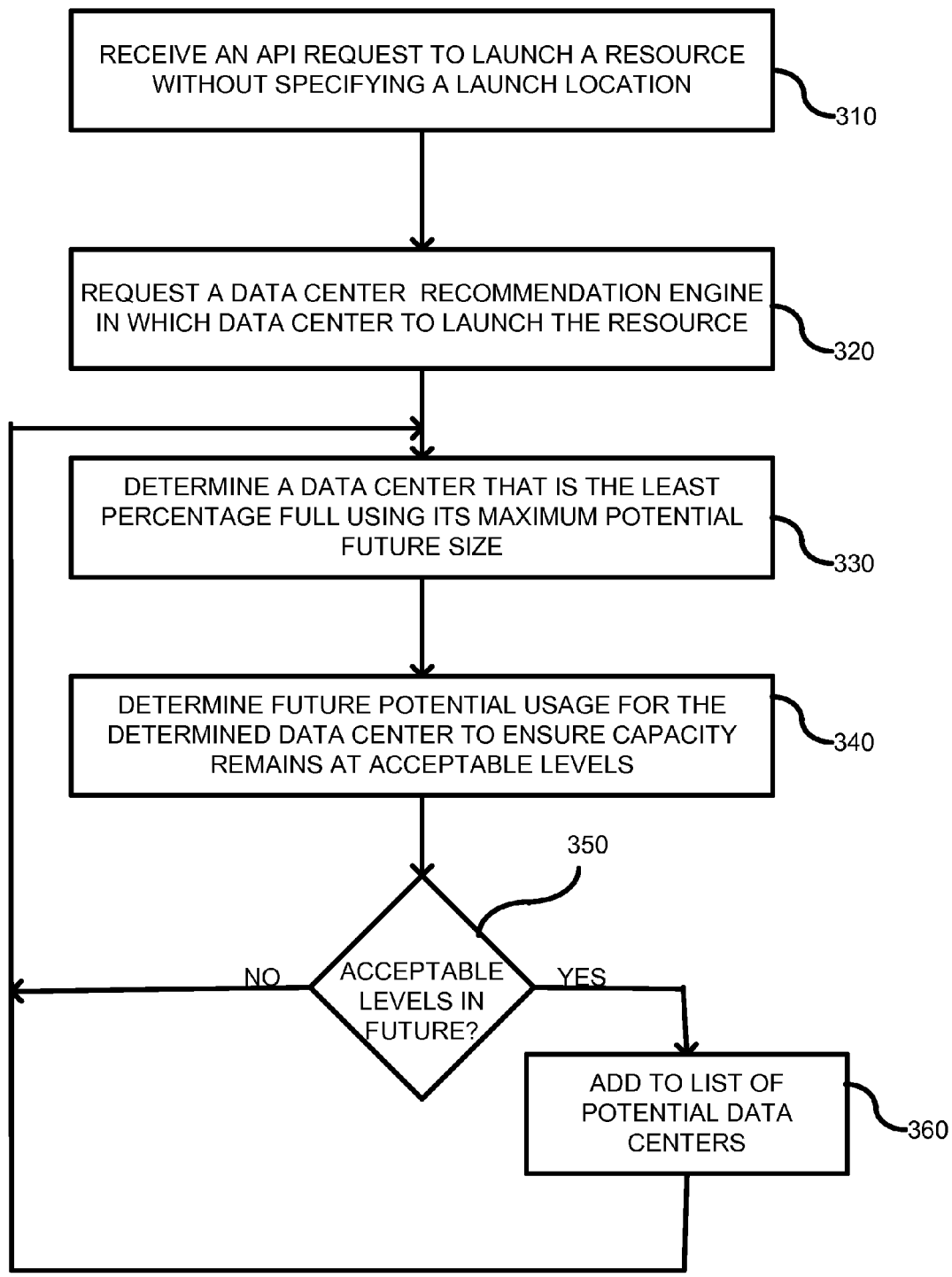
FIG. 3 is a detailed flowchart of an embodiment for providing candidate data centers in which to launch in a priority order.

FIG. 3 is a flowchart according to a possible embodiment for data center growth control in response to requests to launch resources. In process block 310, an API request is received to launch a resource without specifying a launch location (i.e., an untargeted request). The resource can be any of the above-described resources, such as the launching of an instance on a host server computer. In process block 320, a data center recommendation engine receives a request for a data center in which to launch the resource. In process block 330, the data center recommendation engine selects a data center that, for the resource at issue, is the least percentage full using a maximum potential future size of the data center. For example, if a data center currently has 100 host server computers and 50 are in use, but the data center can grow to 200 host server computers in the future, the percentage full is ⁵⁰/₂₀₀ or 25%. The data center with the lowest use is considered the top candidate data center. In process block 340, a future potential usage is determined in order to ensure that the capacity remains at acceptable levels during predetermined future intervals. Thus, the data center recommendation engine analyzes a future capacity based on projections and uses the future capacity to potentially modify the rankings of the candidate data centers. In decision block 350, a check is made to determine if the candidate data center is at acceptable levels of use based on the projections in the future. If so, the data center is added to the list of potential data centers. On the other hand, if decision block 350 is answered in the negative, the data center is not added to the list.

Figure 4:
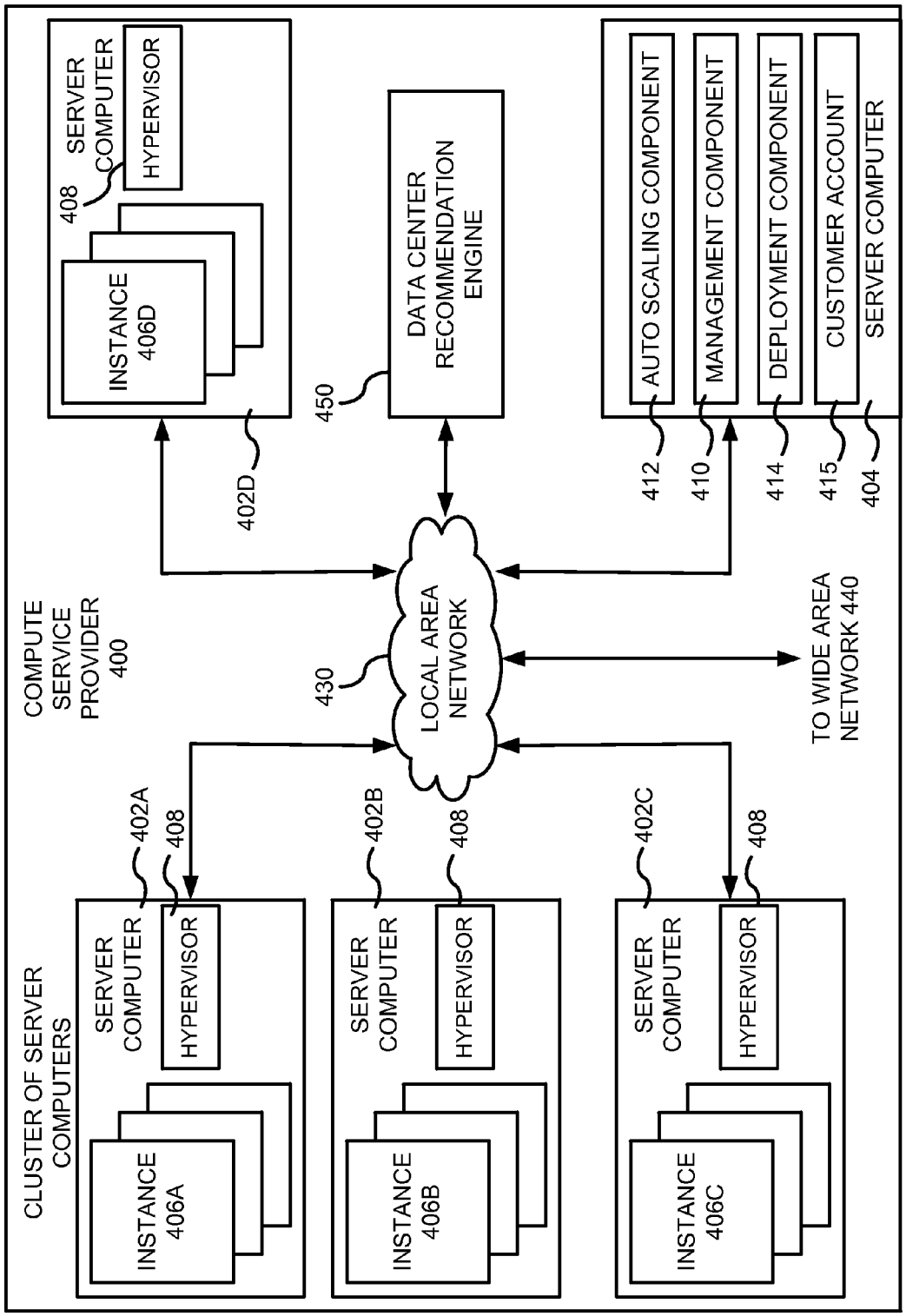
FIG. 4 is an example system diagram showing a plurality of virtual machine instances running in a multi-tenant environment.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404, 450. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

A server 450 can be coupled to the network 430 and perform recommendations of data center growth. As such, the server 450 can be in conformance with any of the embodiments shown herein, such as those shown in FIGS. 1 and 2. In response to receiving an API request, the server 450 can determine which data center a resource should be launched. For example, the data center recommendation engine 450 can examine current usage of the data centers, current maximum capacity of the data centers and future maximum capacity. Based on these parameters, a calculation can be made to determine which data center is the least occupied taking into account its potential capacity in the future. Having selected the least occupied data center, an additional check can be made to ensure that the selected data center is not constrained at a plurality of future spaced time intervals, as it continues to grow. If the selected data center will be constrained at any of the future time intervals, then a next least occupied data center can be selected. That next selected data center can then be checked at future time intervals, and so on, until a data center is selected that is not constrained.

Figure 5:
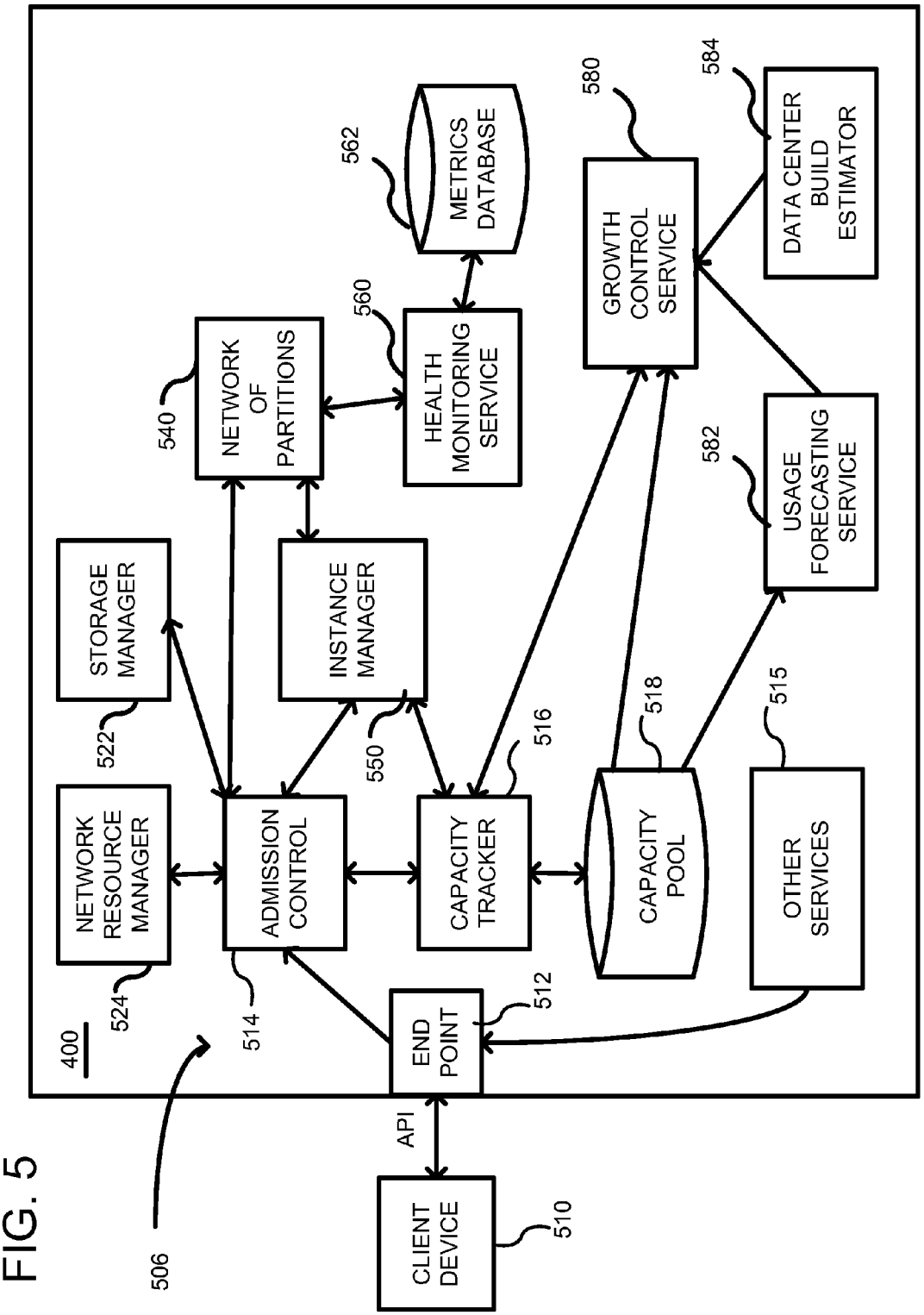
FIG. 5 shows further details of an example system including a plurality of management components associated with a control plane.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process web service requests, such as API calls (also called API requests). In particular, the end point 512 can be a web server configured to expose an API. Using the API requests, a client 510 can make requests to implement any of the functionality described herein. Other services 515, which can be internal to the compute service provider 400, can likewise make API requests to the end point 512.

Other general management services that may or may not be included in the compute service provider 400 include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning and real-time configuration and allocation of capacity. The capacity tracker 516 maintains a pool of available inventory in a capacity pool database 518. The capacity tracker 516 can also monitor capacity levels so as to know whether resources are readily available or limited. An instance manager 550 controls launching and termination of instances in the network. When an instruction is received (such as through an API request) to launch an instance, the instance manager pulls resources from the capacity pool 518, or requests the capacity tracker 516 for an appropriate data center and launches the instance in a decided upon data center.

Rather than pick any available data center in the capacity pool 518, the capacity tracker 516 can make intelligent decisions regarding which data center to use through requests made to the growth control service 580. The growth control service 580 communicates with a usage forecasting service 582, a data center build estimator 584, and the capacity pool 518. The usage forecasting service 582 can obtain current usage data from the capacity pool 518 and make logical extrapolations regarding future resource usage using time series prediction algorithms, such as is well-understood in the art. The data center build estimator 584 can aggregate data supplied manually or automatically to calculate when host server computers or other resources can be available in the future based on physical expansion of the data centers, such as when new rooms will be built. Additionally, the data center build estimator 584 can have a plurality of time-based predictions on when the host server computers or other resources will come available. Using the time-based predictions from the usage forecasting service 582 and the data center build estimator 584, as well as current usage parameters supplied from the capacity pool 518, the growth control service 580 can select a data center in which the resource should be launched. The selected data center can then be supplied to the capacity tracker 516 so that the capacity tracker can choose one of the resources in the capacity pool 518 that is associated with the selected data center. The growth control service 580 can alternatively provide a weighting associated with each data center so as to influence decisions made by the capacity tracker 516. Such weightings can also be stored in association with resources in the capacity pool 518 so that when the capacity tracker 516 accesses available resources, the weightings are also supplied so as to influence a decision which resource to select.

Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 and includes a physical layer upon which the instances are launched.

A health monitoring service 560 can provide monitoring for resources and the applications customers run on the compute service provider 400. System administrators can use the monitoring service 560 to collect and track metrics, and gain insight to how applications are running. For example, the monitoring service 560 can allow system-wide visibility into application performance and operational health. Metrics generated by the health monitoring service 560 can be stored in the metrics database 562. The health monitoring service 560 can further collect state information associated with instances and other resources, which can be retrieved by the end point 512.

Figure 6:
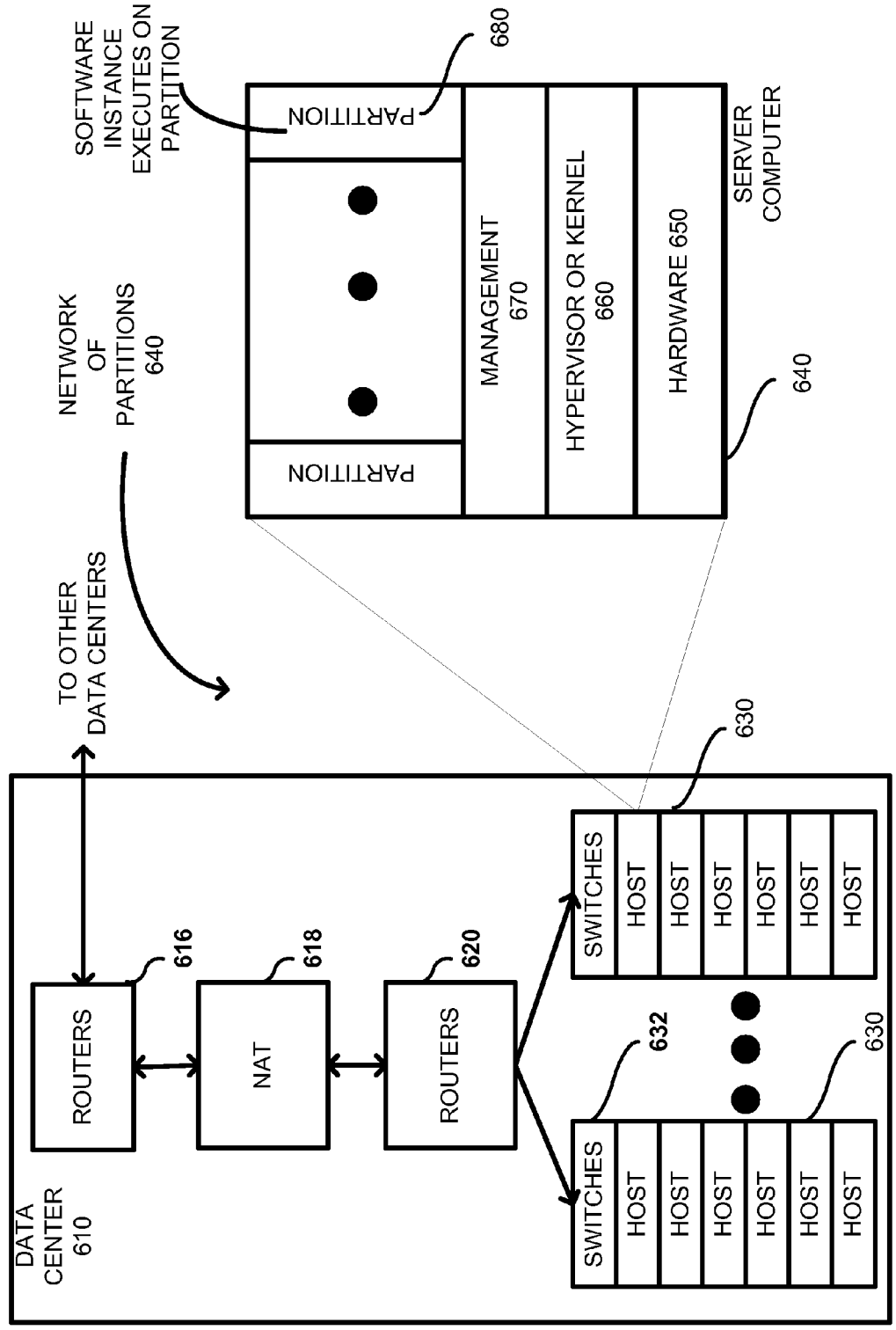
FIG. 6 shows an example of a plurality of host computers, routers and switches, which are hardware assets used for running virtual machine instances.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more CPUs, memory, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 670, which can then pass the metrics to the health monitoring service 560 for storage in the metrics database 562. Additionally, the management layer 670 can pass to the monitoring service 550 the number of instances that are running, when they were launched, the operating system being used, the applications being run, etc. All such metrics can be used for consumption by the health monitoring service 560 and stored in database 562.

Figure 7:
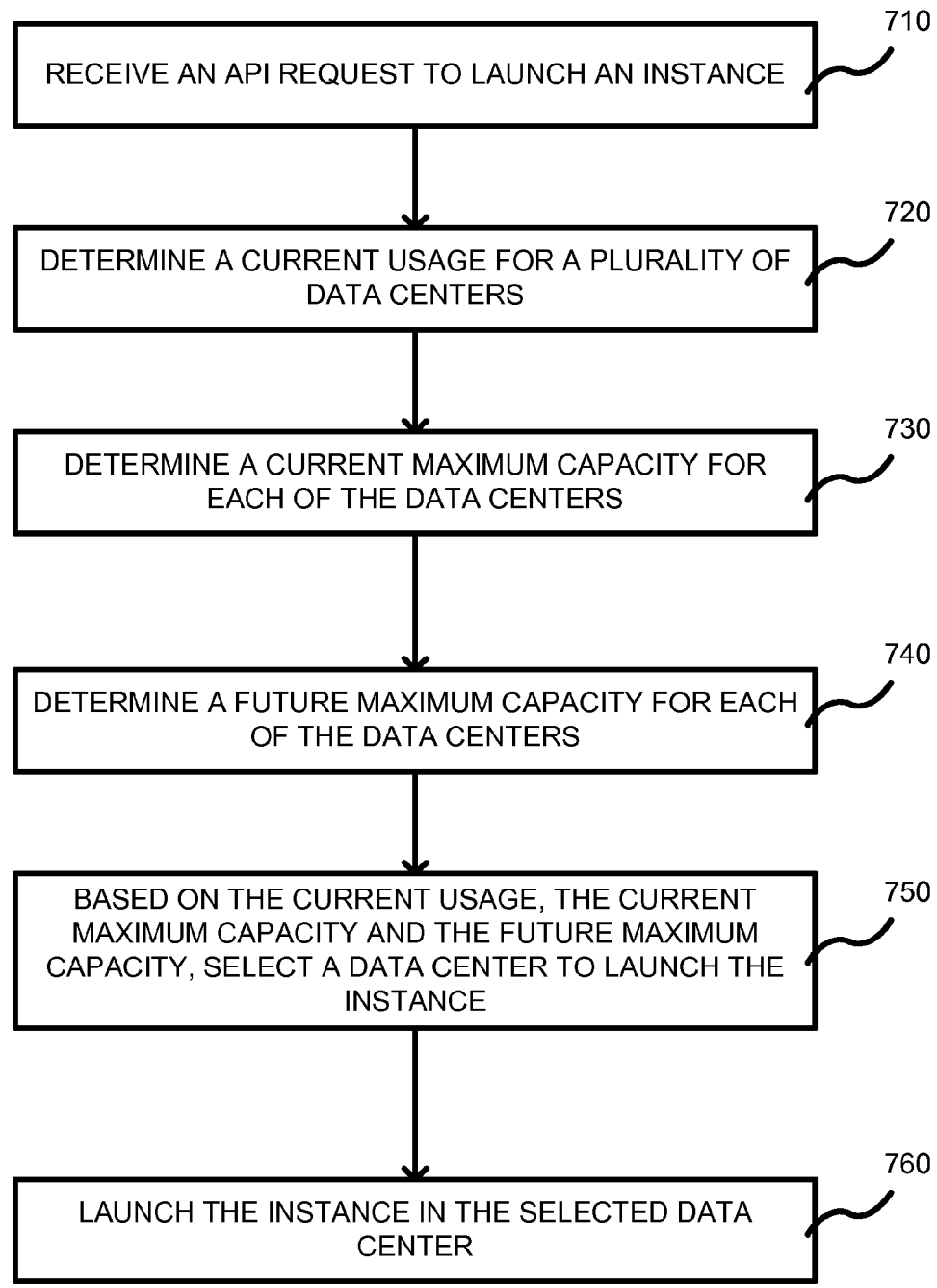
FIG. 7 is a flowchart of an embodiment for controlling data center growth.

FIG. 7 is a flowchart of a method for launching an instance in a multi-tenant environment. In process block 710, an API request can be received for launching an instance. The request can be untargeted meaning that a particular data center is not identified. Although FIG. 7 generically discusses instances being launched, it is understood that it can be expanded to the launching of any resource. In process block 720, a current usage is determined for a plurality of data centers. The current usage is based on a number of instances executing on host computers in the plurality of data centers and such information can be obtained from an instance manager. In process block 730, a current maximum capacity for each of the data centers can be determined. The current maximum capacity is based on a number of instances that can potentially be executing using host server computers that are currently operational. Thus, in a simple example, a data center can have a 1000 host computers, with only 300 in use. The current usage 300, the current maximum capacity is 1000. From this information, a current capacity can be determined, which is associated with the 700 host server computers currently available for hosting instances. For example, the current capacity can be a ratio of the current usage to the current maximum capacity. The current maximum capacity can be a stored number in the capacity pool 518 or stored in association with the instance manager 550. In process block 740, a future maximum capacity for each of the data centers can be determined. The future maximum capacity is based on physical expansion of the data centers such that new host server computers (or other resources) will become available for hosting instances. The future maximum capacity can be determined through the data center build estimator 584. If desired, the future usage can also be obtained through the usage forecasting service 582. Using the determined parameters, a data center can be selected to launch an instance. The data center can be supplied to one or more services associated with launching the instance through one or more supplied weighted parameters or through a list that identifies data centers in a ranked order. In process block 760, an instance can be launched in the selected data center.

Figure 8:
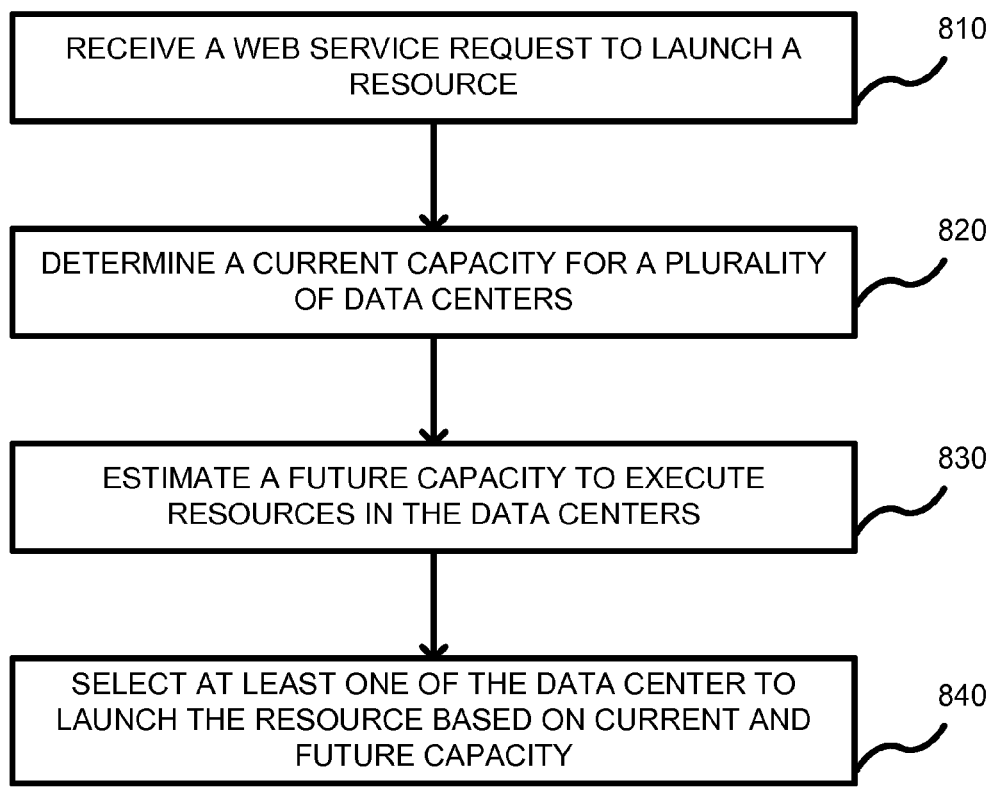
FIG. 8 is a flowchart of according to another embodiment for controlling data center growth.

FIG. 8 is a flowchart of a method for launching a resource according to another embodiment. In process block 810, a web service request is received to launch a resource. The web service request can be, for example, an API request that does not specify a data center in which to launch. The resource can be an instance or other resources identified herein. In process block 820, a current capacity can be determined for a plurality of data centers. The current capacity can be associated with a ratio of a current number of instances executing in each of the plurality of data centers and a current maximum capacity for each of the data centers. In process block 830, a future capacity can be estimated for the data centers. The future capacity can be a future usage and/or a future number of resources that will be available. The future usage can be estimated based on a percentage increase over time of a current usage. The future number of resources available can be based on an estimated time frame for building new rooms to house resources in the data centers. Thus, the future capacity can include an estimate of a maximum number of hosts that can be maintained in each of the plurality of data centers should the data center be built to its maximum size. In process block 840, a selection of at least one of the data centers can be made to launch the resource based on the current and future capacity. Selecting can include estimating a percentage of future use for each data center and selecting a data center so as to maintain an equal percentage of future capacity across data centers.

Figure 9:
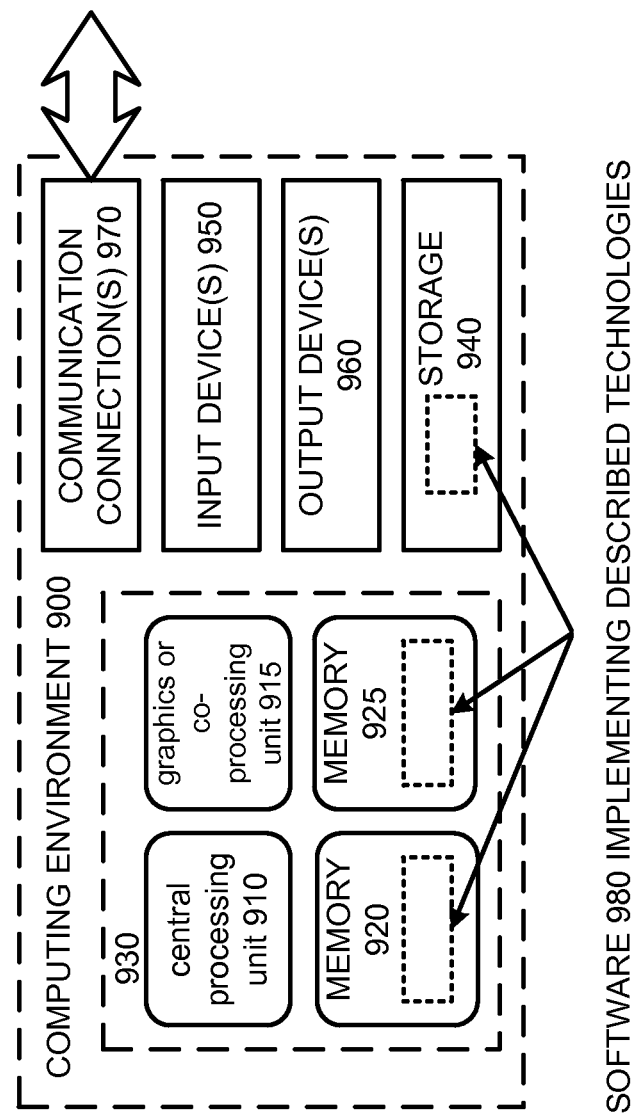
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.)

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of launching instances in a multi-tenant environment having a plurality of data centers, comprising:
   receiving an API request to launch an instance;
   determining a current usage for each of the plurality of data centers in which the instance may be launched;
   determining a current maximum capacity for each of the plurality of data centers in which the instance may be launched, the current maximum capacity based on host server computers already operational in the data centers, wherein the current maximum capacity is based on a number of instances that can be executed using the operational host server computers;
   determining a future maximum capacity for each of the data centers in which the instance may be launched, the future maximum capacity based on expected physical expansion of the data centers and based on a number of host server computers that can be maintained therein;
   based on at least the current usage, the current maximum capacity and the future maximum capacity, selecting at least one of the plurality of data centers in which to launch the instance, wherein the selecting at least one of the plurality of data centers includes selecting the data center so as to maintain an equal percentage of capacity used across the data centers with respect to the future maximum capacity; and
   launching the instance in at least one of the selected data centers.

2. The method of claim 1, further including determining a future usage at predetermined time intervals and wherein selecting includes using the determined future usage.

3. The method of claim 2, wherein the future usage includes API requests that specify one of the plurality of data centers in which to launch the instance and API requests that do not specify one of the plurality of data centers in which to launch the instance.

4. The method of claim 1, wherein the current usage is based on a number of instances executing on host computers in the plurality of data centers.

5. The method of claim 1, wherein determining the future maximum capacity includes predicting when additional capacity will become available due to finishing construction of the expansion.

6. The method of claim 1, wherein selecting at least one of the plurality of data centers includes generating a list in a priority order of the data centers that can be used to launch the instance.

7. The method of claim 6, wherein launching the instance includes checking a first data center on the list against a capacity pool and using the first data center if it is available in the capacity pool, otherwise checking a next data center on the list against the capacity pool and using the next data center if it is within the capacity pool, and continuing to check the next data centers on the list until a data center on the list is selected.

8. A computer-readable storage, which is non-transitory, having instructions thereon for executing a method of launching resources in one or more of a plurality of data centers, the method comprising:

receiving a web service request to launch a resource;
determining a current capacity to execute resources in the plurality of data centers;
estimating future capacity to execute resources in the plurality of data centers, the future capacity including a maximum number of host server computers that can be maintained in at least one of the plurality of data centers should that data center be constructed to its maximum size; and
selecting at least one of the plurality of data centers in which to launch the resource based on the current capacity and the future capacity, wherein the selecting the at least one of the plurality of data centers includes selecting the data center so as to maintain a substantially equal percentage of current capacity used across the data centers.

9. The computer-readable storage of claim 8, wherein the resources are instances and wherein determining the current capacity includes calculating a ratio of a current number of instances executing in each of the plurality of data centers and a current maximum capacity for each of the plurality of data centers.

10. The computer-readable storage of claim 8, wherein selecting includes estimating a percentage of future use of each data center and selecting a data center so as to maintain an equal percentage of future capacity across data centers.

11. The computer-readable storage of claim 8, wherein the web service request is an API request which does not specify one of plurality of data centers in which to launch.

12. The computer-readable storage of claim 8, wherein estimating future capacity includes estimating a time frame for building at least one new room in one of the plurality of data centers.

13. The computer-readable storage of claim 8, wherein estimating future capacity includes estimating a maximum number of hosts that can be maintained in each of the plurality of data centers should the data center be built to its maximum size.

14. The computer-readable storage of claim 8, further including launching the resource in at least one of the selected data centers.

15. The computer-readable storage of claim 8, wherein estimating future capacity includes estimating, for each data center, a number of requests that specify a data center and a number of requests that do not specify a data center.

16. A compute service provider, comprising:
a plurality of data centers;
an end point for receiving API requests;
at least one instance manager for launching new instances on host server computers in response to the API requests;
at least one forecasting service that predicts a future number of instances launched;
a data center growth control service coupled to the at least one forecasting service for selecting which data center to launch new instances in response to the received API requests based on current capacity in the plurality of data centers and the prediction of the future number of instances that can be launched in the plurality of data centers based on expansion, the at least one instance manager for launching a new instance in the selected data center in response to an API request;
wherein the selecting is made so that the plurality of data centers have an equally distributed number of instances executing in the data center on a basis of a percentage of future capacity and wherein the future capacity is based on a number of instances that can be executed within a data center.

* * * * *